United States Patent
Chapman et al.

(10) Patent No.: US 9,141,319 B2
(45) Date of Patent: Sep. 22, 2015

(54) IMAGING SYSTEM WITH REDUCED FUNCTION MODE, AND METHODS THEREFOR

(71) Applicant: Lexmark International, Inc., Lexington, KY (US)

(72) Inventors: Daniel K. Chapman, Sadieville, KY (US); Kevin Dean Schoedinger, Lexington, KY (US)

(73) Assignee: Lexmark International, Inc. KY (US)

( * ) Notice: Subject to any disclaimer, the term of this patent is extended or adjusted under 35 U.S.C. 154(b) by 0 days.

(21) Appl. No.: 14/507,192

(22) Filed: Oct. 6, 2014

(65) Prior Publication Data

US 2015/0098106 A1  Apr. 9, 2015

Related U.S. Application Data

(60) Provisional application No. 61/886,734, filed on Oct. 4, 2013.

(51) Int. Cl.
*G06K 15/00* (2006.01)
*G06F 3/12* (2006.01)

(52) U.S. Cl.
CPC .............. *G06F 3/1239* (2013.01); *G06F 3/121* (2013.01)

(58) Field of Classification Search
CPC .............................. G06F 3/1239; G06F 3/121
USPC ................ 358/1.1, 1.13, 1.14, 1.15, 474, 482
See application file for complete search history.

(56) References Cited

U.S. PATENT DOCUMENTS

| | | | |
|---|---|---|---|
| 8,675,063 B2* | 3/2014 | Bentkovski | 348/143 |
| 2011/0109932 A1* | 5/2011 | Lee | 358/1.14 |
| 2013/0050727 A1* | 2/2013 | Murata | 358/1.13 |
| 2013/0077118 A1* | 3/2013 | Komiyama | 358/1.13 |

* cited by examiner

*Primary Examiner* — Gabriel Garcia

(57) ABSTRACT

A system and method for operating an imaging device is shown. The method includes detecting the malfunction when the imaging device is in a normal mode of operation; causing the imaging device to enter a reduced function mode following the detecting; enabling only one or more functions of the imaging device when in the reduced function mode, the one or more functions being less than all of the functions available when the imaging device is in the normal mode of operation. The one or more functions have operating points when the imaging device is in the reduced function mode that are different than the operating points of the one or more functions when the imaging device is in the normal mode of operation.

16 Claims, 3 Drawing Sheets

IMAGING SYSTEM WITH REDUCED FUNCTION MODE, AND METHODS THEREFOR

CROSS REFERENCES TO RELATED APPLICATIONS

Pursuant to 35 U.S.C. §119, this application claims the benefit of the earlier filing date of Provisional Application Ser. No. 61/886,734, filed Oct. 4, 2013, entitled "Imaging System with Reduced Operation Mode, and Methods Therefor," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to controlling a malfunctioning device, and particularly to a device having a reduced function mode in which a reduced set of functions remains available despite an occurrence of a malfunctioning subsystems of the device.

2. Description of the Related Art

In an effort to better and more timely manage equipment, corporations often consolidate equipment and employ a managed environment for overseeing same. However, the ability to keep devices online is not progressing at the same rate, and any delay in bringing the devices online following a device malfunction can impact company workflow and productivity. In an imaging device, when a sensor or feed roll of the imaging device, for example, causes repetitive media jams or other repetitive malfunctions, the imaging device is typically brought offline and not usable until it is serviced and/or the malfunctioning part is replaced. Repetitive malfunctions are also seen to occur more frequently in the imaging device as the components of the device wear over time, resulting in increased downtime over the life of the imaging device.

SUMMARY

Embodiments of the present disclosure provide a system and method for maintaining an imaging device online and at least partly functional following a malfunction thereby. In an example embodiment, the imaging device is configured to, during the time the imaging device performs in a normal mode of operation, identify a malfunction in the imaging device, and cause the imaging device to enter a reduced function mode following the identification. In the reduced function mode, at least one first function is enabled and at least one second function of the imaging device is disabled, with the at least one first function and the at least one second function being enabled when the device is in the normal mode of operation. When in the reduced function mode, the imaging device is controlled so that the imaging device performs the at least one first function with predetermined operating points. The predetermined operating points may be the same or different from the operating points for performing the at least one first function when the device is in the normal mode of operation. In the example embodiment, the predetermined operating points are relaxed relative to the operating points for performing in the normal mode of operation. In this way, the imaging device is able to continue to perform the at least one first function in the reduced function mode while better avoiding the occurrence of additional malfunctions, until the imaging device can be suitably serviced.

In an example embodiment, the at least one function and the corresponding operating points are selected by a user/operator, such as at the time the imaging device is initially configured. Further, the imaging device may alert the user/operator of the occurrence of the malfunction and prompt the user/operator to authorize the imaging device to enter the reduced function mode. Still further, during the time the imaging device is in the reduced function mode, the imaging device may send one or more status updates to inform or remind the user/operator that the imaging remains in the reduced function mode and awaits servicing.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein.

DETAILED DESCRIPTION

Figure 1:
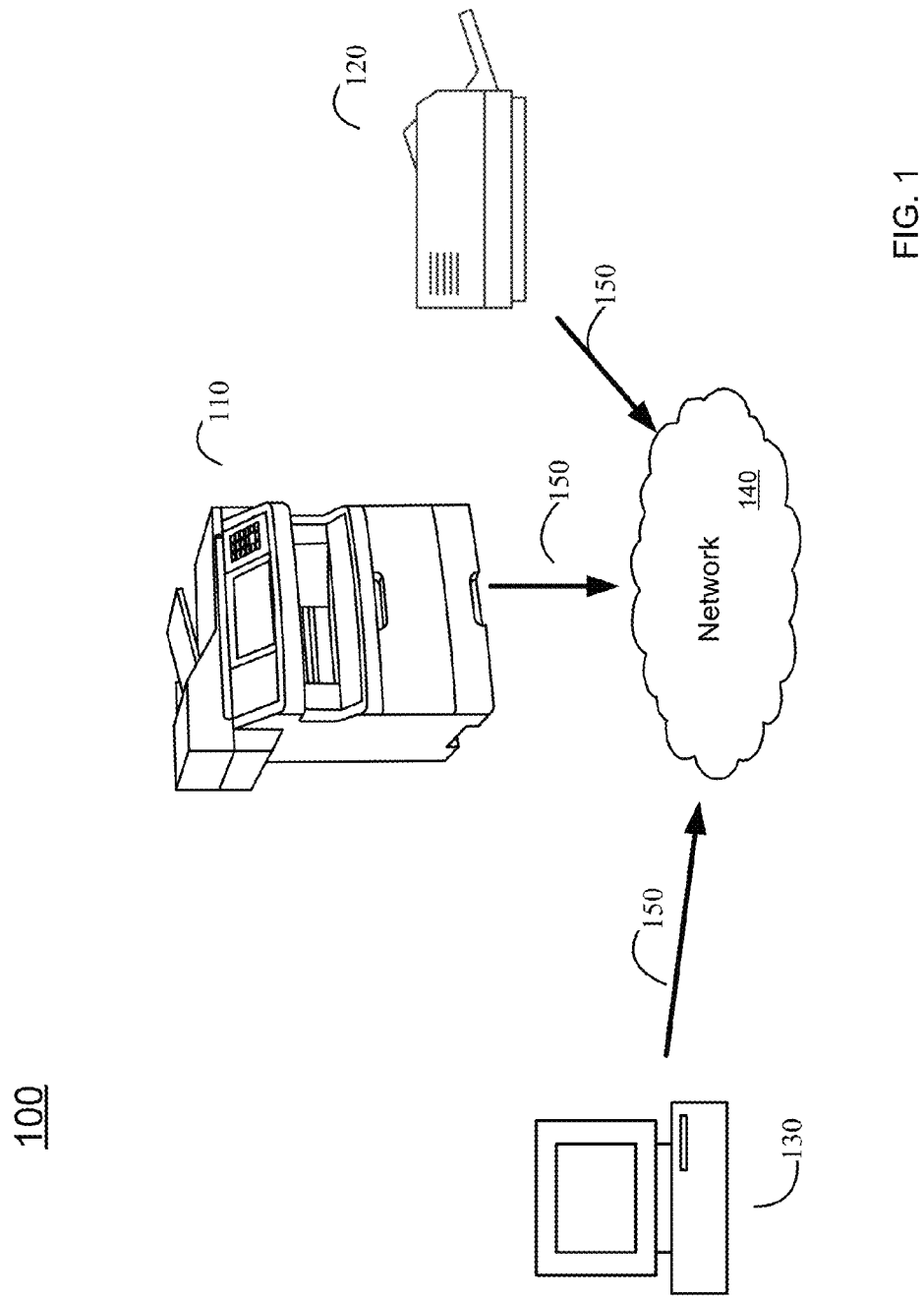
FIG. 1 is an illustration of an imaging system including image forming devices and a remote computer operating according to an example embodiment.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

In FIG. 1, there is shown a diagrammatic depiction of an imaging system 100 embodying the present disclosure. As shown, imaging system 100 may include imaging devices 110 and 120 and a computing device 130. Each imaging device 110, 120 communicates with computing device 130 via a communications link 150. As used herein, the term "communications link" is used to generally refer to any structure that facilitates electronic communication between multiple components, and may operate using wired or wireless technology and may include communications over the Internet and/or other network, hereinafter referred to as network 140. Although two imaging devices 110, 120 are depicted, it is understood that imaging system 100 may include any number of imaging devices which communicate with computing device 130 over network 140.

Computing device 130 may be, for example, a personal computer, electronic tablet, smartphone or other hand-held electronic device, including memory, such as volatile and/or non-volatile memory, an input device, such as a keyboard or keypad, and a display monitor (not shown). Computing device 130 further includes a processor, input/output (I/O) interfaces, and may include at least one mass data storage device, such as a hard drive, a CD-ROM and/or a DVD unit (not shown). In an example embodiment, computing device 130 includes managed print services (MPS) software maintained in memory for generally monitoring the operational status of imaging devices 110, 120 and maintaining same in order to improve efficiency and productivity thereof. Operations performed by MPS software on a computing device is generally known in the art such that a detailed description thereof will not be presented herein for the sake of simplicity.

Each imaging device 110 and 120 may be any device capable of printing or producing a hard copy document stored in electronic form, such as a laser, inkjet or dot matrix printer or a multi-function printing device capable of performing other functions, such a faxing, e-mailing, scanning and/or copying, in addition to printing.

Figure 2:
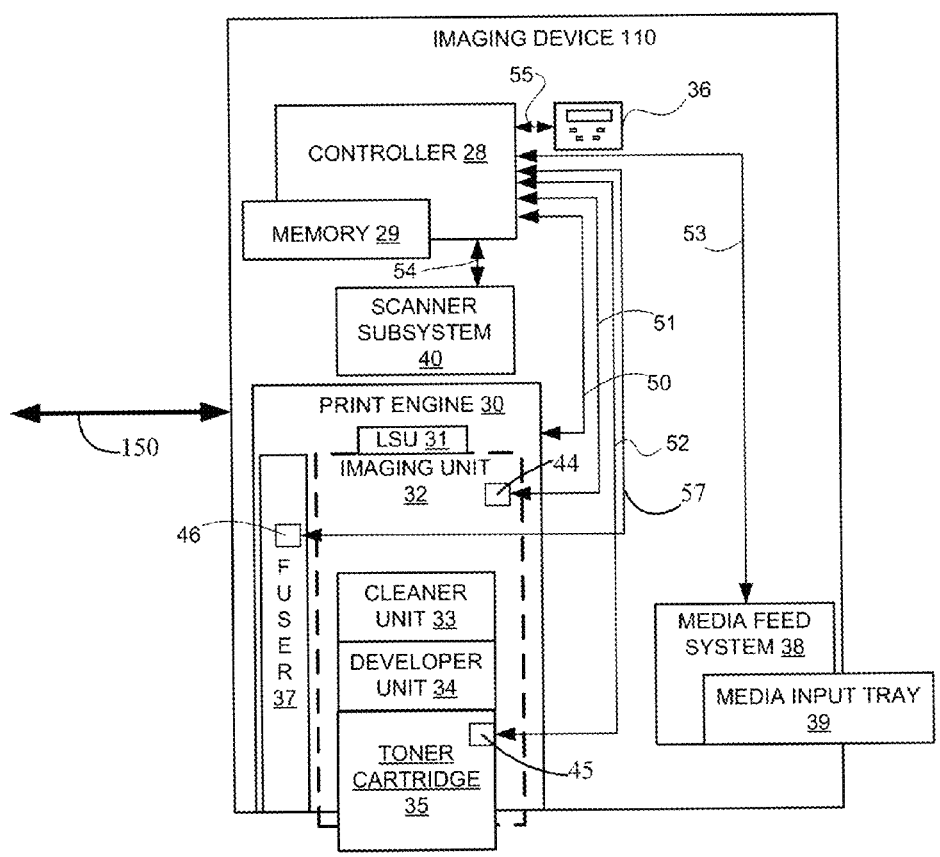
FIG. 2 is a diagram illustrating an imaging device of FIG. 1.

FIG. 2 schematically illustrates imaging device 110 as including controller 28, a print engine 30, a laser scan unit (LSU) 31, an imaging unit 32, a developer unit 34, a toner cartridge or bottle 35, a user interface 36, a media feed system 38 and media input tray 39, and a scanner subsystem 40. Imaging device 110 may communicate with computing device 130 via a standard communication protocol, such as for example, universal serial bus (USB), Ethernet or IEEE 802.xx. Those skilled in the art will recognize that imaging device 110 is depicted as an electrophotographic printer/copier, and by including an integrated scanner system 40 forms a multifunction product. Imaging device 120 may include most of the above subsystems identified above except for a scanner subsystem 40.

Controller 28 includes a processor unit and associated memory 29, and may be implemented as one or more integrated circuits. Memory 29 may be any volatile and/or non-volatile memory such as, for example, random access memory (RAM), read only memory (ROM), flash memory and/or non-volatile RAM (NVRAM). Alternatively, memory 29 may be in the form of a separate electronic memory (e.g., RAM, ROM, and/or NVRAM), a hard drive, a CD or DVD drive, or any memory device convenient for use with controller 28. Controller 28 may be, for example, a combined printer and scanner controller. Controller 28 may be implemented as more than one separate controller device.

In the present embodiment, controller 28 communicates with print engine 30 via a communications link 50. Controller 28 communicates with imaging unit 32 and processing circuitry 44 thereon via a communications link 51. Controller 28 communicates with toner cartridge 35 and processing circuitry 45 therein via a communications link 52. Controller 28 communicates with fuser 37 and processing circuitry 46 therein via a communications link 57. Controller 28 communicates with media feed system 38 via a communications link 53. Controller 28 communicates with scanner system 40 via a communications link 54. User interface 36 is communicatively coupled to controller 28 via a communications link 55. Processing circuit 44, 45, 46 may provide authentication functions, safety and operational interlocks, operating parameters and usage information related to imaging unit 32, toner cartridge 35 and fuser 37, respectively. Controller 28 serves to process print data and to operate print engine 30 during printing, as well as to operate scanner system 40 and process data obtained via scanner system 40.

Print engine 30 may include laser scan unit (LSU) 31, imaging unit 32, and a fuser 37, all mounted within imaging device 110. The imaging unit 32 further includes a cleaner unit 33 housing a waste toner removal system and a photoconductive drum and developer unit 34 which are individually and/or collectively removably mounted within print engine 30 of imaging apparatus 32. In one embodiment, the cleaner unit 33 and developer unit 34 are assembled together and installed onto a frame of the imaging unit 32. The toner cartridge 35, separable from cleaner unit 33 and developer unit 34 so as to be separately removed and replaced when depleted of toner, is then installed on or in proximity with the frame in a mating relation with the developer unit 34. Laser scan unit 31 creates a latent image on the photoconductive drum in the cleaner unit 33. The developer unit 34 has a toner sump containing toner which is transferred to the latent image on the photoconductive drum to create a toned image. The toned image is subsequently transferred to a media sheet received in the imaging unit 32 from media input tray 39 for printing. Toner remnants are removed from the photoconductive drum by cleaner unit 33. The toner image is bonded to the media sheet in fuser 37 and then sent to an output location or to one or more finishing options such as a duplexer, a stapler or hole punch (not shown).

According to an example embodiment, each imaging device 110, 120 is configured to continue performing a basic or otherwise reduced set of functions in a reduced function mode in the event a malfunction occurs in a subsystem of the imaging device not relating to the basic set of functions. The basic set of functions may or may not be performed using lowered or relaxed operating points and require less hardware support in performing the functions. The relaxed operating points may be unique to the particular imaging device 110, 120 or print engine 30 therein. In addition, the basic set of functions may be identified and otherwise associated with the MPS software associated with computing device 130. By performing only a basic set of functions in the reduced function mode upon the occurrence of a malfunction, the malfunctioning imaging device 110, 120 advantageously remains online and at least partly functional prior to its malfunction being serviced.

In the example embodiment, the basic set of functions is defined or otherwise set at an initial stage of imaging device operation, such as during initial setup or configuration of imaging device 110, 120 around the time imaging device 110, 120 is powered up the first time. The basic set of functions may be identified by the system administrator of system 100, the MPS operator or other user of imaging device 110, 120

(hereinafter "operator"). The basic set of functions may be identified for example, by selecting functions from a list of all of the available functions of each imaging device 110, 120 via a drop down menu, buffet list or the like. The basic set of functions may be identified using user interface 36 and related software/firmware of imaging device 110, 120, or using the user interface software that may form part of the MPS software in computing device 130. With each imaging device 110, 120 having its own basic set of functions, the basic set of functions for each imaging device 110, 120 may be customized based upon, for example, the particular usage and basic needs thereof. For example, in one environment, the printing function may be included in the basic set of functions needed for imaging device 110 and thus would be selected for use in the event of a malfunction. Alternatively, a scanning function may be identified and included in the basic set of functions for imaging device 110. In another alternative embodiment, the selections of the basic set of functions may be made automatically by the imaging device 110, 120 or by the MPS software that is used to manage the imaging device. Default settings for the basic set of functions may also be utilized unless or until customized selections are made. Once imaging device 110, 120 enters into the reduced function mode of operation, only the basic set of functions is available to be performed. Subsystems that do not perform or are not otherwise involved in the performing of the basic set of functions are disabled in the reduced function mode of operation. By disabling subsystems of imaging devices 110, 120 in this way and limiting the operation of imaging devices 110, 120 to only those in the basic set of functions, imaging devices 110, 120 are more capable of continuing to remain online and perform the basic set of functions without additional malfunction occurrences.

In addition to selecting the basic set of functions for the reduced function mode, the operating points that are used in performing the basic set of functions may be selected. The operating points may be selected in much the same way the basic set of functions are selected, via a menu drop down list, buffet list or other mechanism for setting configuration values, using user interface 36 of imaging device 110, 120 or computing device 130. As a result, the operating points may be customized for each imaging device 110, 120. In an example embodiment, the operating points selected are reduced or relaxed relative to the operating points of imaging devices 110, 120 when in a normal mode of operation. The operating points may include relaxing both performance characteristics and error checks which makes it more likely that the subsystems performing the basic set of functions in the reduced function mode can function without error. As a result, imaging devices 110, 120 are able to perform, though in a reduced capacity, until imaging device 110, 120 can be serviced.

In the event printing is selected as part of the basic set of functions for an imaging device 110, 120, operating points for printing in the reduced function mode may include, for example: reduced printing speed of 35 pages per minute (ppm), compared to 55 to 70 ppm printing speeds when in the normal mode of operation; reduced throughput by increasing the interpage gap or inserting a pause after a predetermined number of consecutive pages have been printed, relative to the interpage gap amount and absence of a pause when in the normal mode of operation; using reduced or minimum resolution (e.g., 600 dots per inch) relative to a default resolution (e.g., 1200 dpi) during the normal mode of operation; with respect to fuser 37, reduced or no standby fuser temperature, a slower fuser heating profile and/or reduced or minimum fusing temperatures for only supporting plain paper printing, relative to the standby fuser temperature, fuser heating profile and fusing temperatures used when printing in the normal mode of operation; using only one input tray and one output tray or area; disabling duplex printing; ignoring most or all paper path sensor states, with the exception of input and output sensor states; disabling input and output options; and activating at least the secondary fans, while ignoring fan sensors.

In one example embodiment, an imaging device 110, 120 may automatically enter the reduced function mode upon an occurrence of a malfunction in a subsystem thereof which does not contribute to performing of the basic set of functions. Automatic entry may be set by the operator, for example, at or around the time the basic set of functions and corresponding operating points are defined. Alternatively, the operator may configure each imaging device 110, 120 to allow for the operator to authorize entry into the reduced function mode. This may be accomplished, for example, by the malfunctioning imaging device 110, 120 alerting the operator of a malfunction and requesting authorization to enter the reduced function mode. The alert may be sent via email, pop-up message, etc. Once the malfunctioning imaging device 110, 120 enters the reduced function mode, imaging device 110, 120 may occasionally alert the operator that imaging device 110, 120 remains in the reduced function mode. Imaging device 110, 120 may send the alert, for example, at every power-up occurrence thereby or at a predetermined time of day or day of the week.

Figure 3:
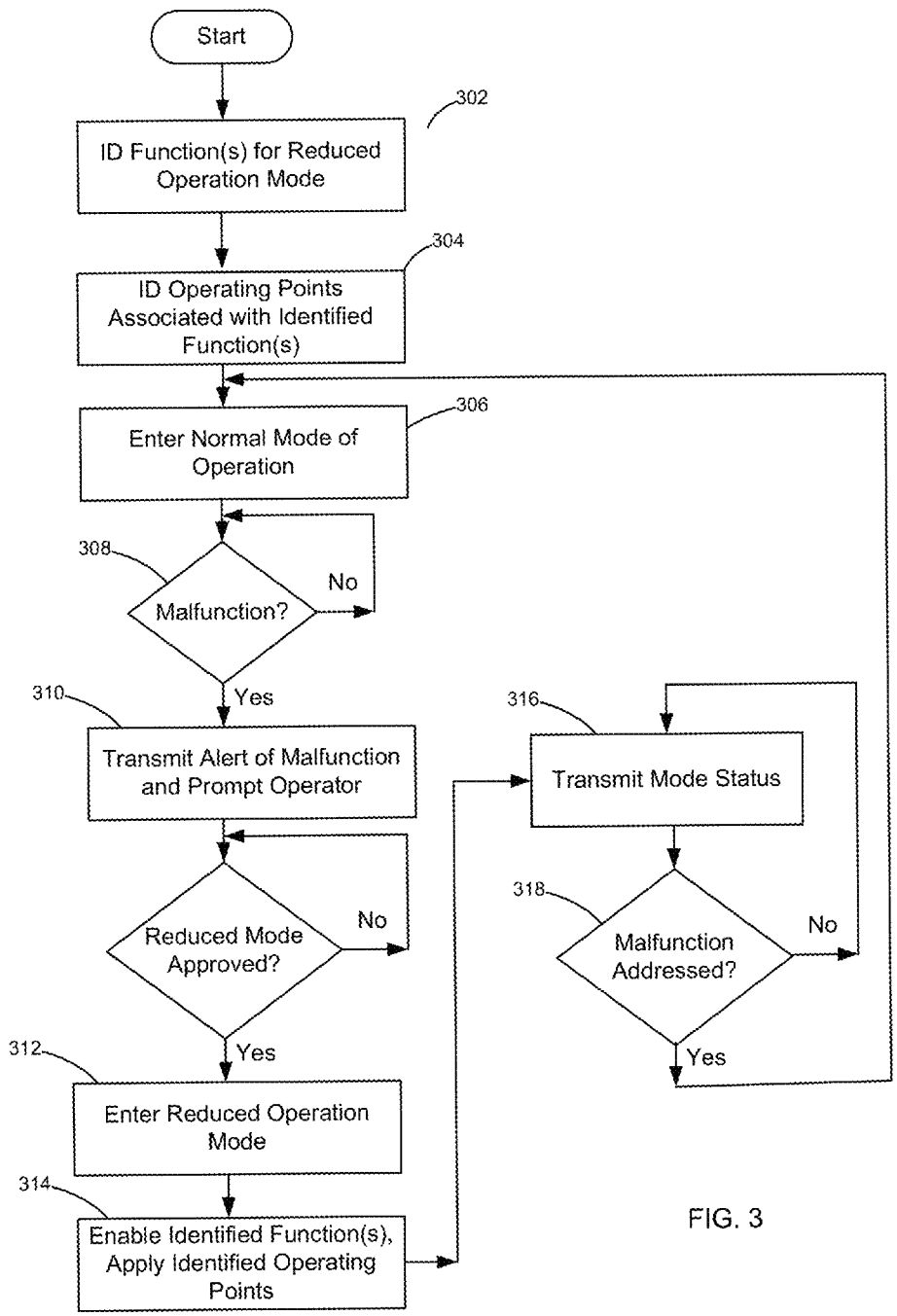
FIG. 3 is a flowchart depicting a method of operation of the imaging device of FIG. 1 according to an example embodiment.

A method of operating imaging device 110, 120 will be described with reference to FIG. 3. At 302, the functions to be included in the basic set of functions for imaging device 110, 120 are identified. The functions may be selected by the operator of imaging device 110, 120 or set by default, and received by the corresponding imaging device 110, 120. The operator may select the functions using the user interface 36 of imaging device 110, 120 or the user interface of the MPS software running on computing device 130. The functions for the basic set of functions may be identified at or around the time imaging device 110, 120 is initially configured, such as following initial power-up of the device. At 304, the operating points for the functions identified in act 302 are identified. The operating points may be selected by the operator using the user interface of imaging device 110, 120 or of the software of computing device 130, or by default and received by the corresponding imaging device 110, 120. Once the basic set of functions and corresponding operating points have been identified and configuration of imaging device 110, 120 has completed, imaging device 110, 120 enters the normal mode of operation at 306.

In the event the imaging device 110, 120 malfunctions at 308, imaging device 110, 120 alerts the operator of the malfunction at 310. As mentioned, the alert may be by email, pop-up message or the like. The alert may also prompt the operator to authorize entry into the reduced function mode such that upon receiving authorization, malfunctioning imaging device 110, 120 enters the reduced function mode at 312. Such authorization may be communicated via user interface 36 or communications link 150 from another device. Alternatively, imaging device 110, 120 may automatically enter the reduced function mode at 312 following detection of the malfunction at 308. In still another embodiment, the operator may cause imaging device 110, 120 to enter the reduced function mode, such as through use of user interface 36 or communications link 150, without imaging device 110, 120 having first encountered a malfunction condition.

Once in the reduced function mode, only those functions of the malfunctioning imaging device 110, 120 identified at 302 are enabled to be performed at 314, using the operating points identified at 304. All other functions of the malfunctioning imaging device 110, 120 are disabled. While in the reduced function mode, the malfunctioning imaging device 110, 120 sends a status update to the operator and/or other designated individual at 316 to remind the operator/individual of the reduced function status. As mentioned, the status update may be sent following the occurrence of a predetermined event, such as following the malfunctioning imaging device 110, 120 being reset and/or powered up, or at a predetermined time of day or day of the week. The status update may be communicated via user interface 36, text messaging, email and/or other communication over network 140.

Upon the malfunctioning imaging device 110, 120 being successfully serviced at 318, the imaging device 110, 120 reenters the normal mode of operation of 306 and awaits another malfunction detection before reentering the reduced function mode.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A system, comprising:
a device having a plurality of subsystems; and
program code, stored in nontransitory memory, having instructions which, when executed by a processor, results in the processor:
during the device performing in a normal mode of operation, identifying a malfunction in at least one of the subsystems of the device, causing the device to enter a reduced function mode following the identifying, the reduced function mode enabling at least one first function and disabling at least one second function of the device, the at least one first function and the at least one second function being enabled when the device is in the normal mode of operation, and controlling the device in the reduced function mode so that the device performs the at least one first function with predetermined operating points that are the same as or different from operating points for performing the at least one first function when the device is in the normal mode of operation, wherein the program code includes instructions which when executed inform an operator associated with the device of the malfunction and prompt the operator to authorize the device to enter the reduced function mode, the device entering the reduced function mode in response to receiving authorization.

2. The system of claim 1, wherein the processor and nontransitory memory are in the device such that the program code is maintained in and executed by the device.

3. The system of claim 1, wherein the program code includes instructions for prompting an operator associated with the device to select the predetermined operating points.

4. The system of claim 1, wherein the device is a printing device or multifunction device which performs printing, and wherein the at least one first function comprises a printing function.

5. The system of claim 1, wherein the predetermined operating points comprise operating points of the device that are relaxed relative to the operating points of the device when performing the at least one first function in the normal mode of operation.

6. The system of claim 5, wherein the at least one function comprises printing, and the predetermined operating points include at least one of reduced process speed, reduced throughput, and reduced or no standby fusing temperature, relative to process speed, throughput and standby fusing temperatures, respectively, when performing the at least one first function when the device is in the normal mode of operation.

7. The system of claim 5, wherein the at least one function comprises printing, and the predetermined operating points comprise at least one of disabling duplex printing, enabling a reduced number of input and output trays or areas relative to a number of input and output trays or areas enabled during printing when the device is in the normal mode of operation, disabling output options, and assuming media type to be narrow media.

8. The system of claim 1, wherein the program code includes instructions for sending, when the device is in the reduced function mode, one or more notifications to an operator associated with the device that the device is operating in the reduced function mode.

9. The system of claim 8, wherein the program code instructions for sending comprise sending a notification each time the device is powered up.

10. A method of operating an imaging device having a malfunction, the method comprising:
detecting the malfunction when the imaging device is in a normal mode of operation;
causing the imaging device to enter a reduced function mode following the detecting, comprising enabling only one or more functions of the imaging device when in the reduced function mode, wherein the one or more functions are less than all of the functions available when the imaging device is in the normal mode of operation, and the one or more functions have operating points when the imaging device is in the reduced function mode that are the same as or different from the operating points of the one or more functions when the imaging device is in the normal mode of operation; and further comprising alerting an operator associated with the imaging device of the malfunction detection, and prompting the operator to authorize the imaging device to enter the reduced function mode, the imaging device entering the reduced function mode in response to receiving authorization from the operator.

11. The method of claim 10, wherein the operating points of the one or more functions when the imaging device is in the reduced function mode are relaxed relative to the operating points of the one or more functions when the imaging device is in the normal mode of operation.

12. The method of claim 11, wherein the one of more functions comprises printing, and the operating points of printing when the imaging device is in the reduced function mode comprise at least one of process speed that is less than process speeds used when the imaging device is printing in the normal mode of operation, throughput that is less than throughput of the imaging device when printing in the normal mode of operation, and minimum resolution of the imaging device when printing.

13. The method of claim 11, wherein the one of more functions comprises printing, and the operating points of printing when the imaging device is in the reduced function mode comprise at least one of reduced or no standby fuser temperature, relative to standby fuser temperature used when printing in the normal mode of operation, slower fuser heating ramp profile relative to the fuser heating ramp profile used when printing in the normal mode of operation, and reduced or minimum fusing temperature relative to fusing temperatures used when printing in the normal mode of operation.

14. The method of claim 11, wherein the one of more functions comprises printing, and the operating points of printing when the imaging device is in the reduced function mode comprise at least one of disabling duplex printing, disabling input and output options, and printing for narrow media widths.

15. The method of claim 10, further comprising when in the reduced function mode, sending a message to remind an operator that the imaging device is in the reduced function mode.

16. The method of claim 10, further comprising receiving selections of the one or more functions and operating points thereof for use in performing the one or more functions when in the reduced function mode.

* * * * *